Oct. 9, 1945. D. C. ROWE ET AL 2,386,348
BOMB INSTALLATION
Filed June 12, 1941 3 Sheets-Sheet 2
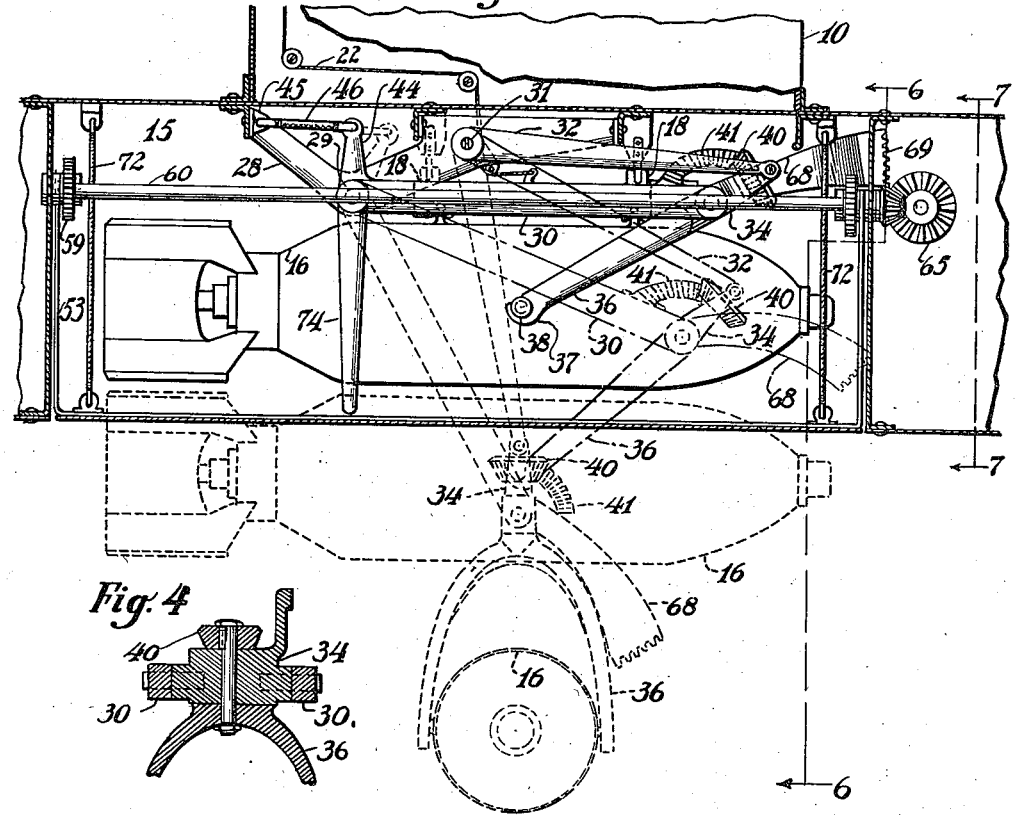
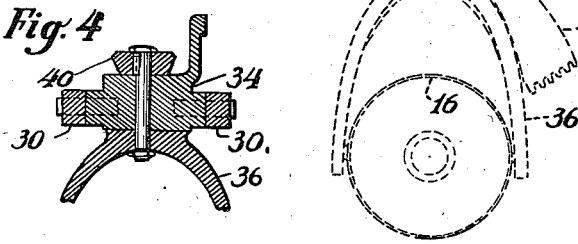
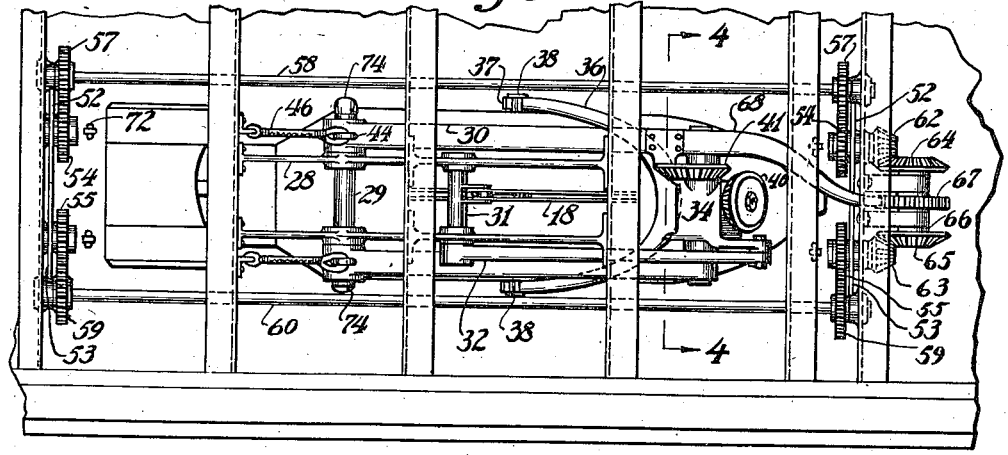
INVENTORS
DONALD C. ROWE AND
BY SAMUEL T. PAYNE
ATTORNEY Oct. 9, 1945.   D. C. ROWE ET AL   2,386,348
BOMB INSTALLATION
Filed June 12, 1941   3 Sheets-Sheet 3

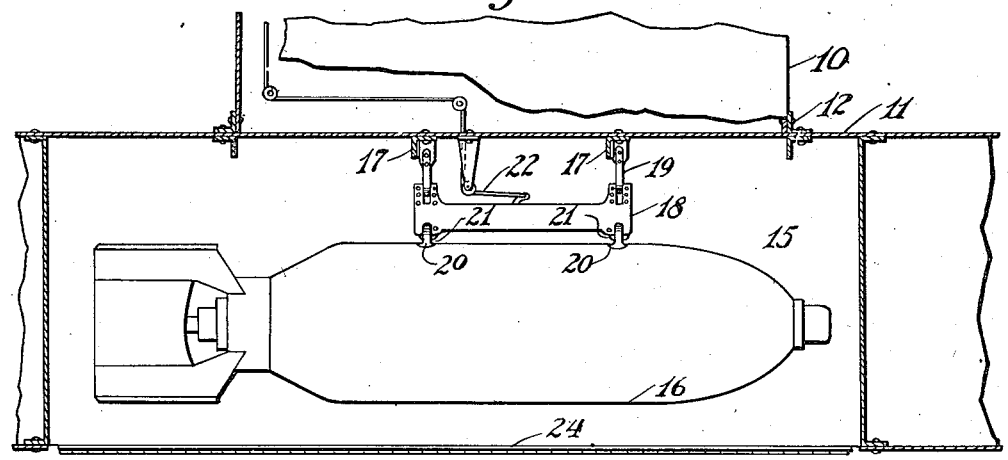
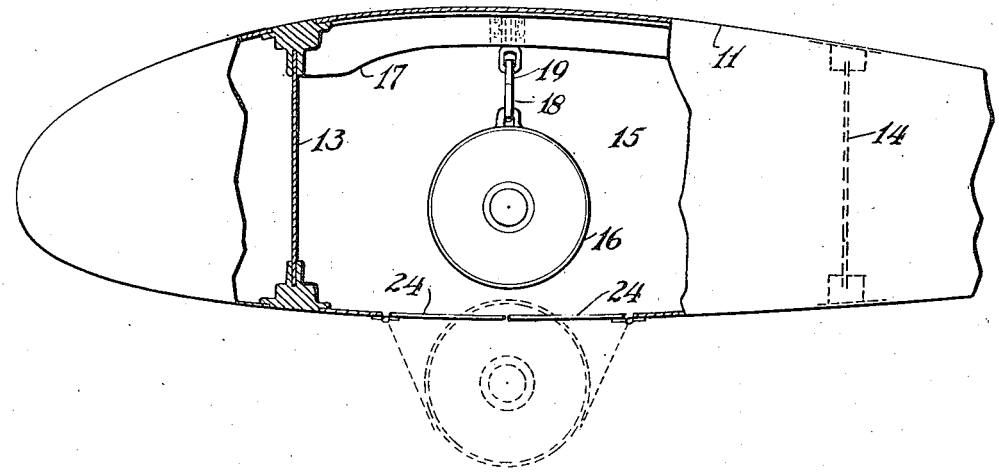

INVENTORS
DONALD C. ROWE AND
BY SAMUEL T. PAYNE

ATTORNEY

Patented Oct. 9, 1945

2,386,348

UNITED STATES PATENT OFFICE 2,386,348

BOMB INSTALLATION

Donald C. Rowe, Snyder, and Samuel T. Payne, Kenmore, N. Y., assignors to Curtiss-Wright Corporation, a corporation of Delaware Application June 12, 1941, Serial No. 397,728

8 Claims. (Cl. 89—1.5)

This invention relates to bomb racks and bomb releasing gears for aircraft and has for a primary object the provision of means by which large bombs may be carried in and dropped from aircraft.

Where moderate-sized aircraft are called upon to carry one or a very few large bombs, it has been customary to suspend the bomb from a rack beneath the fuselage of the aircraft and exterior thereto, since the size of the bomb with respect to the aircraft is so large that an internal bomb bay would interfere with aircraft structure. In modern types of low wing aircraft, the wing structure runs straight across the fuselage and ordinarily, the fore-and-aft distance between the main wing spars is considerably less than the length of a large-sized bomb. Thus, it would be impossible to dispose the bomb with its axis fore-and-aft within the wing structure, the above indicating an additional reason why the bomb is supported outside the confines of the aircraft wing or body. Since the wing spars extend transversely or spanwise of the wing, and since comparatively few chordwise members are necessary in the wing, a cavity may be formed within the wing which has considerable length in spanwise direction and which has a height and width of sufficient magnitude so that a large bomb may be housed in the wing with its axis parallel to the wing span. It is a further object of the invention to dispose a bomb within an aircraft wing and with the bomb axis parallel to the wing span and normal to the line of flight, an associated object being to house a large bomb within the confines of a moderate-sized aircraft without interfering with the structural integrity of the aircraft and furthermore securing the advantage of eliminating the additional aerodynamic drag which results from supporting a bomb exterior to the streamlined form of the aircraft.

A further object of the invention is to provide means to guide a bomb, after its release, so that it must drop clear of the aircraft structure without interfering with the same and so that the bomb is turned during its initial dropping for alinement of the bomb axis with the air stream, thus eliminating initial lateral drift and inaccuracy in dropping which might occur if the bomb were dropped clear of the aircraft in such an attitude that the bomb axis was normal to the air stream.

A further object of the invention is to provide bomb bay doors which are opened automatically upon release of a bomb from the bay and which are closed automatically after the bomb is clear of the aircraft.

Further objects of the invention will become apparent in reading the detailed description below in connection with the drawings, in which:

Fig. 1 is a front elevation, partly in section, of an aircraft wing and bomb installation;

Fig. 2 is a side elevation, partly in section, showing the wing and bomb installation;

Fig. 3 is a front elevation, partly in section, through an aircraft wing showing an alternative bomb releasing gear;

Fig. 4 is a section on the line 4—4 of Fig. 5;

Fig. 5 is a fragmentary plan of the aircraft wing with the top cover removed;

Figure 6:
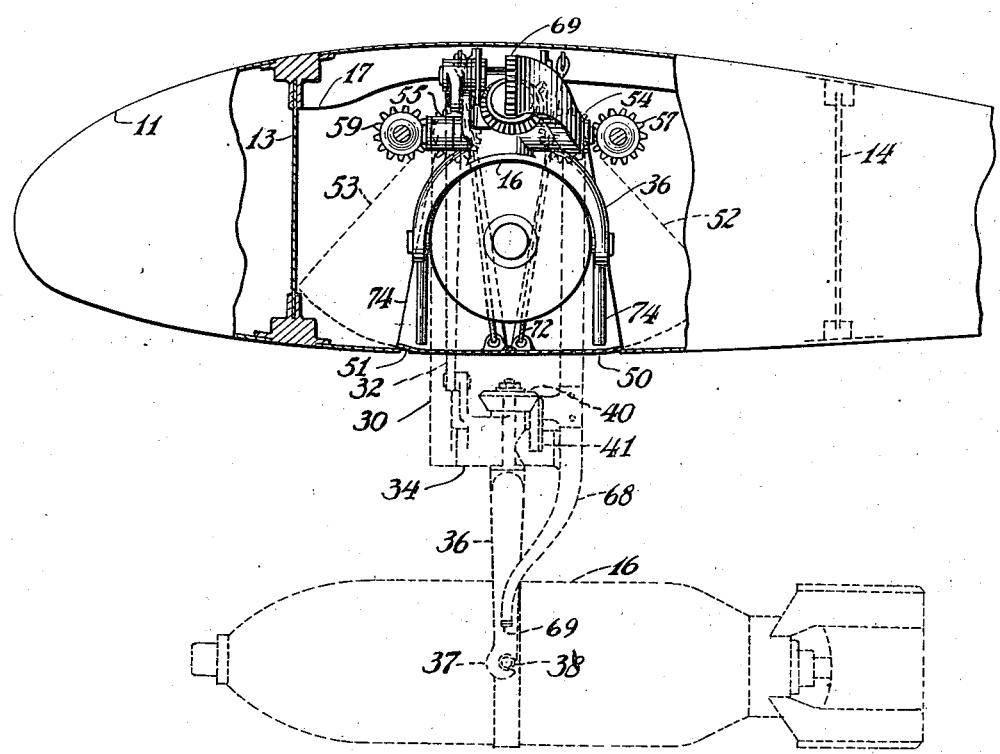
Fig. 6 is a side elevation, partly in section, of the wing and bomb installation and is a section on the line 6—6 of Fig. 3.
Figure 7:
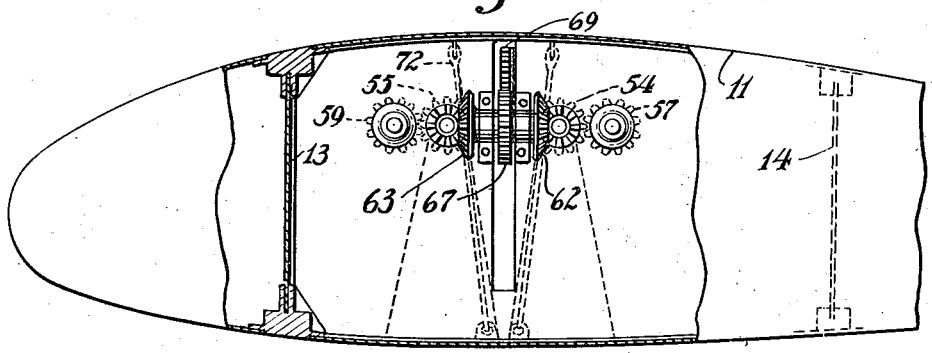
Fig. 7 is a side elevation of the wing and bomb installation, on the line 7—7 of Fig. 3.

First referring to Figs. 1 and 2, we indicate fragmentarily an aircraft fuselage 10 across the lower surface of which extends a structurally integral wing 11, the fuselage and wing being secured to one another by rivets or the like 12. The wing comprises transversely extending main spar members 13 and 14 whose chordwise spacing defines within the wing a cavity 15 which is utilized as a bomb bay. We propose to carry in this bay a large bomb 16 whose length is somewhat greater than the distance between the spars 13 and 14. Accordingly, the bomb is disposed transversely of the aircraft. The spanwise length of the bay 15, as shown in Fig. 1, is somewhat greater than the length of the bomb 16, this substantial length for the bay being obtainable without interference with the structural integrity of the spars 13 and 14 or with the balance of the wing structure. Suitable ribs 17 form a bridge between the upper ends of the spars 13 and 14 and to these ribs the bomb holding and releasing rack 18 is secured by links 19. The bomb is provided with conventional eyes 20 engaged by hooks 21 of the rack 18 which hooks are releasable through the action of a cable 22 under the control of the bombardier. The rack 18 is of known and conventional construction so no detail of its operation is deemed necessary. The bottom surface of the wing, immediately beneath the suspended bomb 16 is provided with hinged trap doors 24 preferably urged toward a closed position by springs, not shown. When the bomb is released, it falls against the trap doors 24 urging them open to permit passage of the bomb and after the bomb has dropped clear of the aircraft, these doors return to their closed position. Shortly after dropping clear of the aircraft, the bomb will aline itself with its local airstream in virtue of the normal characteristic of the bombs wherein their center of gravity is forwardly disposed with respect to their center of aerodynamic pressure. Should the space between the spars 13 and 14 permit, two or possibly more bombs could be supported in the bay 15 without displacing the bombs materially from the center of gravity of the aircraft which normally is located a distance, rearwardly of the wing leading edge, at substantially 30% of the wing cord.

Figs. 3 to 7 show basically the same arrangement as is shown in Figs. 1 and 2 in so far as the wing structure, the bomb 16, and the bomb rack 18 are concerned. However, we provide in these latter figures auxiliary guiding means and door operating devices by which the bomb is forced to drop clear of the aircraft wing in its transverse attitude, after which the bomb is turned through substantially 90% about a vertical axis (with respect to the airplane) to aline the bomb with the local air stream before it is wholly free from the aircraft.

Above the bomb and within the bay 15, a brace 28 is secured to the aircraft structure, this brace having a pivot 29 on which is journalled a primary guide frame 30. The brace 28 is also provided with a pivot 31 on which is journalled a secondary guide frame 32. The righthand ends of the frames 30 and 32 pivotally carry a fitting 34 which forms an end link for a pantograph comprised by the fitting 34 and the frames 30 and 32. In this fitting, a fork 36 is journalled for rotation about the axis of the fork shank and the fork ends include hooks 37 which engage lugs 38 rigid with the bomb 16. Thus far, it becomes apparent that, when the bomb rack 18 is released, the bomb drops downwardly and carries with it the elements 30, 32, 34, and 36 which form a guide enforcing vertically downward drop of the bomb until it is clear of the aircraft. Means are provided to rotate the fork 36 after the frame members have dropped to such an extent that the bomb is substantially clear of the wing bottom while in its transverse attitude, the fork rotation causing rotation of the bomb about a substantially vertical axis to aline it in a fore-and-aft direction with the local air stream. The means mentioned comprise a bevel gear 40 mounted upon the stem of the fork 36 which is engageable with a bevel gear segment 41 secured to the primary frame 30. When the frame is in its fully retracted position, the gear 40 is not engaged with the segment 41, as shown in Fig. 5, but as the frame drops upon bomb release, the axle of the gear 40 is swung relative to the frame so that, when the bomb reaches the dot-dash line position of Fig. 3, the end of the segment 41 engages the bevel gear 40 and rotation of the fork with respect to the fitting 34 is initiated. When the frame reaches its lowermost dotted line position, the fork will have then rotated through 90° to aline the bomb i na fore-and-aft direction, as shown in Fig. 6, whereupon the bomb lugs 38 may drop out of the fork hooks 37.

The upper end of the frame 30, adjacent the pivot 29, is provided with two arms 44 whose upper ends are joined to the aircraft structure at 45 by means of elastic cords 46. These cords are of sufficient strength to retract the frame 30 and its associated parts after the bomb weight is relieved therefrom but the cords are inadequate to support the frame and bomb jointly. Thus, when the bomb release gear 18 is operated, the bomb weight carries the guiding frame downwardly through the wing bottom, stretching the cords 46 but upon complete release of the bomb, the guiding frame is retracted into the wing by the cords 46.

Referring principally to Fig. 6, we show swingable doors 50 and 51 which have end plates 52 and 53 whose upper ends are secured to pinions 54 and 55. There is a pinion 54 and also a pinion 55 at each end of the bomb bay. With each pinion 54 is meshed a pinion 57, said pinions 57 being carried by a layshaft 58 whereby both pinions 54 are caused to rotate in unison. Similarly, with each pinion 55 is meshed a pinion 59, pinions 59 being carried on a layshaft 60 whereby the pinions 55 are caused to rotate in unison. As shown in Fig. 5, the righthand pinions 54 and 55 carry bevel pinions 62 and 63 respectively, the bevel pinions 62 and 63 being meshed with bevel gears 64 and 65 mounted on a common shaft 66 to which is secured a spur gear 67. The primary frame 30 carries an extension arm 68 on the end of which a spur gear segment 69 is formed, this segment 69 being engageable at times with the gear 67. As shown in Fig. 3, when the guide frame system is fully retracted, the gear segment 69 engages the gear 67 at its bottom tooth with the pinion 67. Upon release of the bomb, the segment 69 drops with the frame and causes approximately one-half turn of rotation of the gear 67 which, through its connections with the pinions 54 and 55, swings the doors 50 and 51 about their axes to an open position, as shown in dotted lines in Fig. 6, thus opening the bomb bay for discharge of the bomb and for passage of the guide frame system through the bottom opening of the wing. As soon as the gear segment 69 has passed the gear 67, the doors remain open while the bomb dropping action, previously recited, takes place. After release of the bomb, the guide frame system is retracted within the bomb bay and, during the final stage of retraction, the gear segment 69 again engages the gear 67, rotating the pinions 54 and 55 to close the doors 50 and 51, thereby re-establishing the continuous profile of the lower surface of the wing. Elastic cords 72 are attached at their ends to the top of the wing structure and to the doors 50 and 51, these cords serving to hold the doors in either their open or closed positions when the rack 69 is not engaged with the gear 67. The cords 72 are so disposed, as shown, that they pass the axes of the pinions 54 and 55 during opening or closing movement of the doors 50 and 51 whereby the same cords serve to hold the doors either open or closed, depending upon the position to which they have been moved by the gear segment 69.

As an additional means to prevent swaying of the bomb on its release rack 18, sway braces 74 depend from the brace member 28.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

We claim as our invention:

1. In aircraft having a transverse bomb receiving cavity therein, the cavity being long in a spanwise direction and relatively narrow in a fore-and-aft direction, the combination of a rack secured to the aircraft lengthwise of the cavity to which a bomb is attachable, and means activated by bomb release from said rack to turn the bomb from an axially transverse attitude to an axially fore-and-aft attitude with respect to the aircraft.

2. In an aircraft having a bomb cavity therein, means to releaseably support an elongated bomb within said cavity with its major dimension substantially parallel to the lateral axis of said aircraft, and means automatically operative to turn said bomb to a fore-and-aft attitude with respect to said aircraft upon release of said bomb from said first mentioned means.

3. In an aircraft wing having a bomb cavity therein, means to releaseably support an elongated bomb within said cavity spanwise of said wing, and means automatically operative to turn said bomb to a fore-and-aft attitude with respect to the aircraft upon release of said bomb from said mentioned means.

4. In an aircraft having a bomb cavity therein, means to releaseably support an elongated bomb within said cavity with its major dimension substantially parallel to the lateral axis of said aircraft, the dimensions of said bomb cavity being such that it is incapable of receiving said bomb in a fore-and-aft attitude with respect to said aircraft, and means automatically operative to turn said bomb to a fore-and-aft attitude with respect to said aircraft upon release of said bomb from said first mentioned means.

5. In an aircraft wing having a bomb cavity therein, means to releaseably support an elongated bomb within said cavity substantially spanwise of said wing, door means over the bottom of said bomb cavity, means automatically operative upon release of said bomb from said first mentioned means for opening said door means, and means automatically operative to turn said bomb to a fore-and-aft direction with respect to said aircraft after it has fallen clear of said wing and door means.

6. In an aircraft including an inside bomb bay, means to releaseably support an elongated bomb within said bomb bay with its major dimension substantially parallel to the lateral axis of said aircraft, guide means adapted to engage said bomb and extendible with the bomb from the bomb bay upon bomb release from said first mentioned means, and means automatically operative to rotate said guide means and hence the bomb engaged thereby during extension of said guide means such that said bomb drops clear of said guide means and aircraft in a fore-and-aft attitude with respect to said aircraft.

7. In an aircraft including an inside bomb bay, means to releaseably support an elongated bomb within said bomb bay with its major dimension substantially parallel to the lateral axis of said aircraft, guide means adapted to engage said bomb and extendible with the bomb from the bomb bay upon bomb release from said first mentioned means, means automatically operative to rotate said guide means and hence the bomb engaged thereby during extension of said guide means such that said bomb drops clear of said guide means and aircraft in a fore-and-aft attitude with respect to said aircraft, and means to retract said guide means into the bomb bay after the bomb has dropped clear of said guide means.

8. In an aircraft having a bomb cavity therein, means to releaseably support an elongated bomb within said cavity with its major dimension inclined laterally relative to the fore-and-aft axis of said aircraft, and means automatically operative to turn said bomb to a substantially fore-and-aft attitude with respect to said aircraft upon release from said first mentioned means.

DONALD C. ROWE.
SAMUEL T. PAYNE.